US012422693B2

(12) United States Patent
Uno

(10) Patent No.: US 12,422,693 B2
(45) Date of Patent: Sep. 23, 2025

(54) OPTICAL IMAGING SYSTEM, METHOD FOR PERFORMING OPTICAL IMAGE STABILIZATION

(71) Applicant: BEIJING XIAOMI MOBILE SOFTWARE CO., LTD., Beijing (CN)

(72) Inventor: Masaru Uno, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 682 days.

(21) Appl. No.: 17/789,776

(22) PCT Filed: Nov. 10, 2020

(86) PCT No.: PCT/CN2020/127883
§ 371 (c)(1),
(2) Date: Jun. 28, 2022

(87) PCT Pub. No.: WO2022/099479
PCT Pub. Date: May 19, 2022

(65) Prior Publication Data
US 2023/0042087 A1 Feb. 9, 2023

(51) Int. Cl.
G02B 27/64 (2006.01)
G03B 5/06 (2021.01)

(52) U.S. Cl.
CPC .............. G02B 27/646 (2013.01); G03B 5/06 (2013.01); G03B 2205/0023 (2013.01); G03B 2205/0061 (2013.01); G03B 2205/0069 (2013.01)

(58) Field of Classification Search
None
See application file for complete search history.

(56) References Cited

U.S. PATENT DOCUMENTS 5,041,852 A    8/1991  Misawa et al.
7,777,969 B2 * 8/2010  Shirono ............... G02B 13/009
                                              359/698

(Continued)

FOREIGN PATENT DOCUMENTS

CN    1908736 A    2/2007
CN   107942605 A    4/2018

(Continued)

OTHER PUBLICATIONS

Extended European Search Report for EP application No. 20961038.5 dated Aug. 12, 2023, (8p).

(Continued)

Primary Examiner — Derek S. Chapel
(74) Attorney, Agent, or Firm — Arch & Lake LLP

(57) ABSTRACT

An optical imaging system includes a sensor configured to obtain position and attitude information of the optical imaging system; an optical lens component; an image stabilizing mechanism, configured to change a path of the light based on the position and attitude information. The image stabilizing mechanism includes a first optical element; a support frame supporting the first optical element; at least two magnets, disposed on two sides of the first optical element, respectively; at least two coils, facing to the at least two magnets, respectively. When a current flows through the coil, the respective magnet is driven to move according to a direction of the current, to cause the movable support frame carrying the first optical element to move with respect to one or more axes to change the path of the light.

18 Claims, 3 Drawing Sheets

(56) References Cited

U.S. PATENT DOCUMENTS

| | | |
|---|---|---|
| 7,809,256 B2 | 10/2010 | Kuroda et al. |
| 8,009,972 B2 | 8/2011 | Kuroda et al. |
| 9,723,211 B2 | 8/2017 | Sekimoto |
| 10,516,773 B2 | 12/2019 | Yoon et al. |
| 2007/0031134 A1 | 2/2007 | Kuroda et al. |
| 2007/0031135 A1* | 2/2007 | Ito ........................... G02B 7/08 |
| | | 396/79 |
| 2007/0133967 A1 | 6/2007 | Takahashi et al. |
| 2010/0322607 A1 | 12/2010 | Kuroda et al. |
| 2018/0109660 A1 | 4/2018 | Yoon et al. |
| 2020/0084308 A1 | 3/2020 | Yoon et al. |
| 2020/0137274 A1 | 4/2020 | Lee et al. |
| 2020/0209439 A1 | 7/2020 | Hu et al. |
| 2020/0218082 A1 | 7/2020 | Choi et al. |
| 2020/0301116 A1 | 9/2020 | Aschwanden et al. |

FOREIGN PATENT DOCUMENTS

| | | | |
|---|---|---|---|
| CN | 111432098 A | 7/2020 | |
| CN | 111670389 A | 9/2020 | |
| DE | 102014104430 B4 * | 10/2015 | ............... G02B 7/04 |

OTHER PUBLICATIONS

International Search Report of PCT/CN2019/127883 dated Jun. 2, 2021 with English translation, (2p).

* cited by examiner

OPTICAL IMAGING SYSTEM, METHOD FOR PERFORMING OPTICAL IMAGE STABILIZATION

CROSS-REFERENCE TO RELATED APPLICATIONS

This application is a national phase application of International Application No. PCT/CN2020/127883, filed Nov. 10, 2020, the entire content of which is incorporated herein by reference for all purposes.

TECHNICAL FIELD

The present disclosure relates to an imaging technology, and more particularly to an optical imaging system, and a method for performing optical image stabilization.

BACKGROUND

In recent years, more and more ordinary people may have chances to take pictures using cameras. When a user takes a picture by holding the camera with his hands, an undesirable movement of the camera is nearly inevitable due to any movement of the user's hands during a considerable long exposure, which may lead to a poor image quality. Thus, optical image stabilization becomes an important task in imaging. However, in the existing optical image stabilization technology, an attitude difference issue and a resonance issue easily occur, or a distortion issue may occur.

Thus, there is a need to provide an imaging system which may perform optical image stabilization, without incurring the attitude difference issue, the resonance issue or the distortion issue.

SUMMARY

Embodiments of the present disclosure provide an optical imaging system and a method for performing optical imaging stabilization.

In a first aspect of the present disclosure, there is provided an optical imaging system. The optical imaging system includes a sensor, configured to obtain position and attitude information of the optical imaging system; an optical lens component, configured to receive light for imaging; an image stabilizing mechanism, configured to compensate for a movement of the optical imaging system based on the position and attitude information. The image stabilizing mechanism includes: a first optical element, configured to change a path of the light to be directed into the optical lens component; a support frame, configured to support the first optical element; at least two magnets, disposed on two sides of the first optical element, respectively; and at least two coils, facing to the at least two magnets, respectively. When a current is introduced into the coil based on the position and attitude information, the respective magnet is driven to move according to a direction of the current, so as to cause the support frame carrying the first optical element to move with respect to one or more axes to change the path of the light.

In a second aspect of the present disclosure, there is provided a method for performing optical image stabilization, which is applied to an optical imaging system. The optical imaging system includes a sensor; an optical lens component, configured to receive light for imaging; an image stabilizing mechanism including: a first optical element configured to be movable to change a path of light; a support frame configured to support the first optical element; at least two magnets, disposed on two sides of the first optical element, respectively, and at least two coils, facing to the at least two magnets, respectively. The method includes: obtaining position and attitude information of the optical imaging system; and providing currents to the at least coils based on the position and attitude information to drive the at least two magnets to move according to a direction of the current, so as to cause the support frame carrying the first optical element to move with respect to one or more axes to change the path of the light.

In a third aspect of the present disclosure, there is provided a non-transitory computer-readable medium having instructions stored thereon for execution by a processor to implement operations of the method according to the second aspect.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

In order to clearly illustrate technical solutions of embodiments of the present disclosure, a brief description of drawings used in embodiments is given below. Obviously, the drawings in the following descriptions are only part embodiments of the present disclosure, and for those skilled in the art, other drawings can be obtained according to these drawings without creative labor.

DETAILED DESCRIPTION

Figure 1:
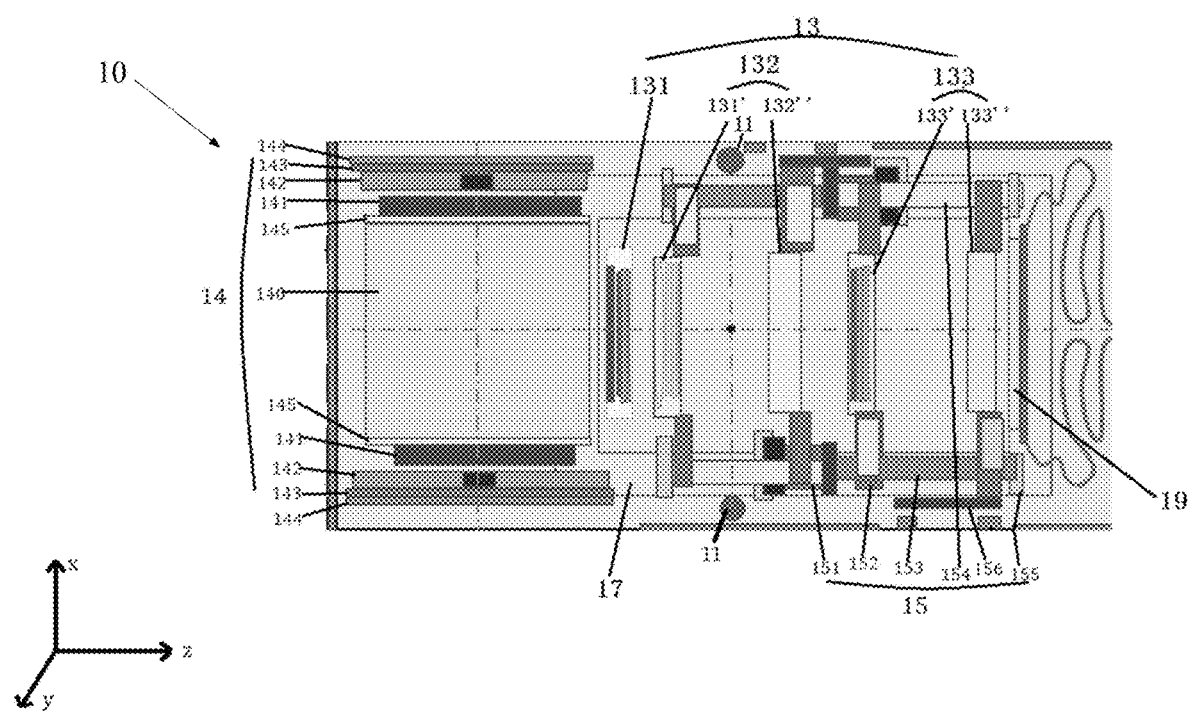
FIG. 1 is a diagram illustrating a size view of an optical imaging system according to an embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Embodiments of the present disclosure provide an optical imaging system, and a method for performing optical image stabilization, to compensate for a movement of the optical imaging system and to improve an image quality.

Figure 2:
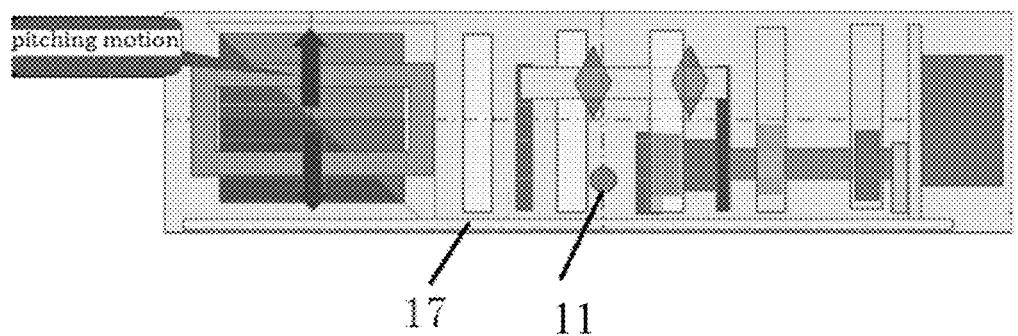
FIG. 2 is a diagram illustrating a top view of an optical imaging system according to an embodiment of the present disclosure.

FIG. 1 illustrates a side view of an optical imaging system according to an embodiment of the present disclosure, and FIG. 2 illustrates a top view of the optical imaging system. In some embodiments, the optical imaging system may be a camera which may be installed on a mobile device, or other portable device such as a personal computer, a laptop or the like.

As illustrated in FIG. 1 and FIG. 2, the optical imaging system 10 may include a sensor (not shown), an optical lens component 13 and an image stabilizing mechanism 14. The optical imaging system 10 may further include a housing for accommodating the sensor, the optical lens component 13 and the image stabilizing mechanism 14. The image stabilizing mechanism 14 is disposed in front of the optical lens component 13, so that incident light of the optical imaging system 10 passes through the image stabilizing mechanism 14 and then enters into the optical lens component 13.

The sensor is configured to obtain position and attitude information of the optical imaging system. The sensor may be any sensor capable of obtaining position and attitude information including position and rotational direction of the optical imaging system, for example, the sensor may include, but be not limited to a gyro sensor or the like. In a case that the optical imaging system is included in a camera, any movement of the camera may cause a movement of the optical imaging system, typically, including a rolling motion, a pitching motion and the like. The position and attitude information of the optical imaging system may be used to indicate the rolling motion and the pitching motion of the optical imaging system. The sensor may be disposed at any location suitable to detect the position and attitude information.

The optical lens component 13 is configured to receive the light for imaging. As illustrated in FIG. 1, the optical imaging system 10 includes an image sensor 19. Typically, a surface of the image sensor 19 is configured as an imaging surface on which an image is formed. The image sensor 19 is configured to convert the light passing through the optical lens component 13 to electric signals for forming the image.

The image stabilizing mechanism 14 is configured to compensate for a movement of the optical imaging system based on the position and attitude information. As illustrated in FIG. 1 and FIG. 2, the image stabilizing mechanism 14 is disposed in front of the optical lens component 13, so that the optical lens component 13 receives light from the image stabilizing mechanism 14. When an image is captured or a video is shot, the image or the video may become blurred due to many factors, such as a hand-shake movement or the like. In this case, the image stabilizing mechanism 14 may be configured to change the path of the light to compensate for the movement of the optical imaging system duo to the hand-shake movement.

In some embodiments, the image stabilizing mechanism 14 may be a twin VCM (i.e., voice coil motor) actuator.

As illustrated in FIG. 1, the image stabilizing mechanism 14 may include a first optical element 140, at least two magnets 141, at least two coils 142 and a support frame 145. The first optical element 140 is disposed in front of the optical lens component 13 along the optical axis of the optical imaging system 10. The first optical element 140 includes a light-entering surface, a light-exiting surface and a light-reflecting surface. When the first optical element 140 is in a normal state (i.e., not rotated or moved), the light (parallel to the x axis) enters into the first optical element 140 through the light-entering surface, and when the light reaches the light-reflecting surface, the light is reflected by the light-reflecting surface to pass through along the optical axis (i.e., z axis) of the optical imaging system 10 and exit from the first optical element 140 through the light-exiting surface. The support frame 145 may be disposed, for example on both sides of the first optical element 140 to support the first optical element 140. The at least two magnets 141 are disposed on two sides of the first optical element 140, respectively. The at least two magnets 141 are disposed in parallel to the light-entering surface of the first optical element 140. The at least two coils 142 are facing to the at least two magnets 141, respectively. For example, the coil 142 is disposed on one side of the respective magnet that is far wary from the first optical element 140, and the coil 142 is also parallel to the light-entering surface of the first optical element 140.

In an embodiment, as illustrated in FIG. 1, the image stabilizing mechanism 14 may further include flexible printed circuit boards 143 and the at least two coils 142 are disposed on flexible printed circuits 143 through which the currents can be provided to the at least two coils 142.

The first optical element 140 is configured to change the path of the light and direct the incident light to the optical lens component 13. The support frame 145 is configured to be movable to carry the first optical element 140 to move.

Figure 4:
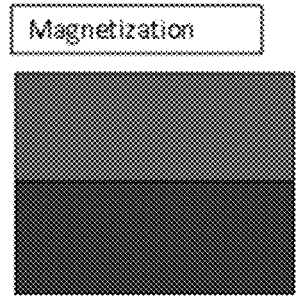
FIG. 4 is a diagram illustrating magnetic force producing by the magnets.

When a current is introduced into the coil based on the position and attitude information, the respective magnet is driven to move according to a direction of the current, so as to cause the support frame carrying the first optical element to move with respect to one or more axes to change the path of the light. FIG. 4 illustrates the magnetic force producing by the magnets due to the current flowing through the coil. When the current flows through the coil, the respective magnet may be driven to move upwardly or downwardly according to a direction of the current based on Fleming's left-hand rule.

When the captured image or the shot video becomes blurred due to a hand-shake movement or the like, the image stabilizing mechanism 14 may be configured to provide a relative displacement corresponding to movement of the optical imaging system to the support frame 145 to compensate for the movement of the optical imaging system duo to the hand-shake movement. The support frame 145 carrying the first optical element 140 may be configured to move with respect to a first axis (i.e., x axis) parallel to an imaging surface and perpendicular to the at least two magnets and/or a second axis (i.e., z axis) perpendicular to the imaging surface, i.e., the optical axis of the optical imaging system.

Figure 3:
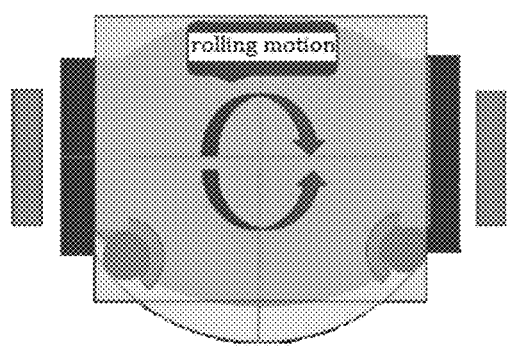
FIG. 3 is a diagram illustrating a rolling motion of an optical element in the optical imaging system according to an embodiment of the present disclosure.

When the current flowing through the coils is controlled properly, the first optical element 140 may tilt for the pitching direction or the rolling direction. In some embodiments, when the same current flows through the at least two coils, the at least two magnets are driven to move, to cause the first optical element to rotate around the first axis (i.e., x axis) parallel to an imaging surface and perpendicular to the at least two magnets, such that the first optical element tilts for the pitching direction, as shown in FIG. 2. The same current flowing through the at least two coils means that the currents flowing through the at least two coils have the same magnitude and direction. In some embodiments, when the different currents flow through the at least two coils, the at least two magnets are driven to move, to cause the first optical element to rotate around the second axis (i.e., z axis) perpendicular to the imaging surface, such that the first optical element tilts for the rolling direction, as shown in FIG. 3. The different currents flowing through the at least two coils means that the currents flowing through the at least two coils may be different in one or both of the magnitude and direction.

In some embodiments, when the sensor is a gyro sensor, a target pitching angle and a target rolling angle of the first optical element 140 can be decided by calculation values derived from the gyro sensor.

Figure 5:
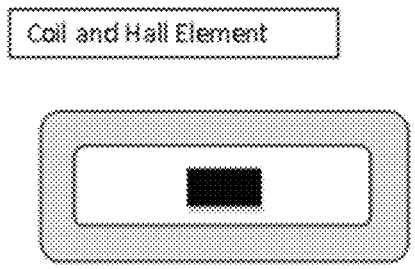
FIG. 5 is a diagram illustrating a coil and a hall element in the optical imaging system according to an embodiment of the present disclosure.

In some embodiments, position and attitude information of the first optical element 140 can be obtained to realize a closed-loop control, such that the movement of the first optical element 140 can be controlled accurately. Thus, in order to realize the closed-loop control, a position detection sensor may be provided. In an embodiment, the position detection sensor may be a Hall element. As illustrated in FIG. 5, the Hall element may be disposed inside the coil. The hall element may be configured to obtain a position of each magnet so as to obtain a distance between the magnets disposed on two sides of the first optical element 140. When the distance changes, it means that at least one of the magnets is driven to move by the current flowing through the coil, such that it is possible to control the first optical element 140 to move to a target pitching angle and a target rolling angle.

In some embodiments, the image stabilizing mechanism may further include at least two yokes 144 facing to the at least two coils, respectively. The yoke 144 is disposed in parallel to the light-entering surface of the first optical element 140. As illustrated in FIG. 1, the coil 142 can be disposed between the yoke 144 and the magnet 141, the coil 142 and yoke 144 may face to the magnet 141 as a pair. The at least two yokes 144 are configured to generate magnetic force with the at least two magnets 141 to hold the support frame. According to a relationship between the magnet and the yoke, magnetic levitation occurs, which may be used to hold the support frame. The magnetic levitation occurs parallel to the magnet and yoke with magnetic suction power.

In some embodiments, the optical imaging system may further include a bearing component. The bearing component may be configured to contact with the housing of the optical imaging system and to be rotatable on the spot. The bearing component may be configured for holding the support frame. As illustrated in FIG. 1 and FIG. 2, the bearing component may include two ball bearings 11 at around a center area of the optical imaging system.

In some embodiments, the first optical element may be a mirror which may reflect light or a prism. When the first optical element is a prism, the prism may have the light-entering surface and the light-exiting surface perpendicular to each other, and the light-reflecting surface joining with both the light-entering surface and the light-exiting surface.

By means of the image stabilizing mechanism, the optical image stabilization may be realized to compensate for the movement of the optical imaging system, such that the image quality can be improved without incurring the distortion, color shift or image blur issue.

The optical lens component 13 may include a plurality of lenses arranged along the optical axis of the optical imaging system 10. As illustrated in FIG. 1 and FIG. 2, the optical lens component 13 may include a fixed first lens component 131, a movable second lens component 132 and a movable third lens component 133. In some embodiments, as illustrated in FIG. 1, the optical imaging system 10 may further include a sub frame 17. In an embodiment, the sub frame 17 and the support frame 145 may be integrally formed. The first lens component 131 is fixed on the sub frame 17. The second lens component 132 and the third lens component 133 are movably mounted on the sub frame 17, and can be moved along the optical axis of the optical imaging system 10. The second lens component 132 may include a zoom lens group, and the third lens component 133 may include an AF (i.e., auto focusing) lens group. The second lens component 132 and the third lens component 133 may move together based on a mode of the optical imaging system. The optical imaging system may have a telephoto mode and a wide-angle mode.

In some embodiments, as illustrated in FIG. 1, the optical imaging system 10 may further include a piezoelectric driving mechanism 15 configured to drive the movable second lens component 132 and the movable third lens component 133 to move together along the optical axis (i.e., z axis) based on a mode switching instruction. The mode switching instruction may be obtained by the optical imaging system 10 based on a user's operation.

In some embodiments, the piezoelectric driving mechanism 15 may include a piezoelectric part 151, a support part 152, a drive part 153, a guide area 154 and a shaft 155. The support part 152 is configured to be movably disposed on the sub frame 17 and to support the lens component, such that the lens component is mounted on the sub frame 17 in a movable way. The piezoelectric part 151 is configured to provide piezoelectric power for the drive part 153. The drive part 153 is configured to convert the piezoelectric power into mechanical force to drive the shaft 155 to move. The movement of the shaft 155 causes the support part 152 carrying the lens component to move in the guide area 154, such that the lens component can be moved along the optical axis.

The piezoelectric driving mechanism 15 is configured to drive the movable second lens component 132 to move between a first position and a second position based on the mode switching instruction to switch the optical imaging system between the telephoto mode and the wide-angle mode. As illustrated in FIG. 1, when the optical imaging system is in the telephoto mode, the second lens component 132 is moved to the first position (i.e., 132'), and when the optical imaging system is in the wide-angle mode, the second lens component 133 is moved to the second position (i.e., 132").

Further, the piezoelectric driving mechanism 15 is configured to drive the movable third lens component 133 to move to a focusing position with movement of the movable second lens component 132. The focusing position indicates a position at which the optical imaging system realizes focusing. As illustrated in FIG. 1, when the optical imaging system is in the telephoto mode, the third lens component 133 is moved to a focusing position (i.e., 133') where the auto focusing is realized, and when the optical imaging system is in the wide-angle mode, the second lens component 133 is moved to a focusing position (i.e., 133") where the auto focusing is realized.

The positions of the movable second lens component 132 and the movable third lens component 133 can be obtained when they are moved to provide a closed-loop control. Accordingly, a position detection sensor 156 can be provided. The position detection sensor 156 can be a Hall element.

In some embodiments, each of the movable second lens component and the movable third lens component is moved within a range of 0-5 cm.

In some embodiments, a movement resolution each of the movable second lens component and the movable third lens component reaches 0.3 μm.

In some embodiments, the piezoelectric driving mechanism comprises two smooth impact drive mechanisms, one smooth impact drive mechanism is configured to drive the movable second lens component to move and the other smooth impact drive mechanism is configured to drive the movable third lens component to move with movement of the movable second lens component.

By means of the piezoelectric driving mechanism, the auto focusing of the optical imaging system may be realized.

With the optical imaging system according to embodiments of the present disclosure, the image stabilizing mechanism is configured to change a path of light based on the position and attitude information of the optical imaging system to compensate for the movement of the optical imaging system. The image stabilizing mechanism includes a first optical element, a support frame, at least two magnets and at least two coils. When a current flows through the coil, the respective magnet is driven to move according to a direction of the current, so as to cause the support frame carrying the first optical element to move with respect to one or more axes to change the path of the light. In this way, the optical image stabilization can be performed without incurring the attitude difference issue, the resonance issue or the distortion issue.

Further, in the optical imaging system according to embodiments of the present disclosure, the optical lens component configured to receive the light from the first optical element for imaging is driven by the piezoelectric driving mechanism, such that an integration of electromagnetic and piezoelectric technology is realized. Furthermore, the optical imaging system according to embodiments of the present disclosure is advantageous in saving cost and space.

The present disclosure further provides a method for performing optical image stabilization.

Figure 6:
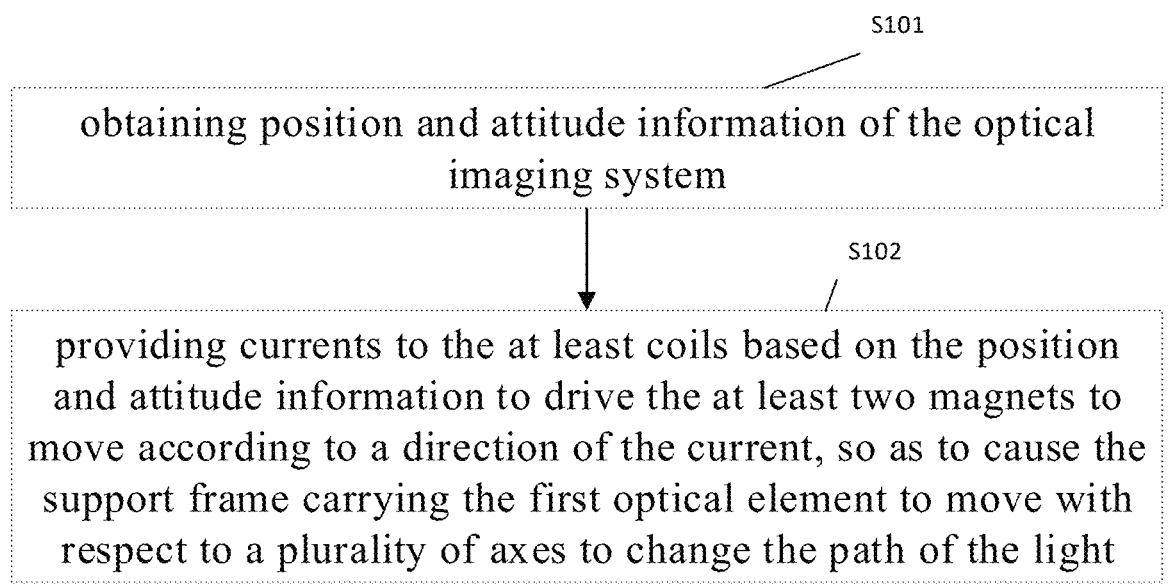
FIG. 6 is a flow chart illustrating a method for performing optical image stabilization according to an embodiment of the present disclosure.

FIG. 6 illustrates a flow chart of a method for performing optical image stabilization according to an embodiment of the present disclosure. The method may be applied in the optical imaging system 10 as shown in FIG. 1. The optical imaging system 10 includes a sensor, an optical lens component 13 configured to receive the light for imaging and an image stabilizing mechanism 14. The image stabilizing mechanism 14 includes: a first optical element 140 configured to change a path of the light, a support frame 145 configured to support the first optical element, at least two magnets 141, disposed on two sides of the first optical element, respectively; and at least two coils 142, facing to the at least two magnets, respectively. As illustrated in FIG. 6, the method may include the followings.

At block S101, position and attitude information of the optical imaging system is obtained.

The position and attitude information may be obtained by the sensor, which may be a gyro sensor or a Hall element. The position and attitude information may be used to indicate the pitching motion and the rolling motion of the optical imaging system.

At block S102, currents are provided to the at least coils based on the position and attitude information to drive the at least two magnets to move according to a direction of the current, so as to cause the support frame carrying the first optical element to move with respect to one or more axes to change the path of the light.

When the current flows through the coil, the respective magnet is driven to move upwardly or downwardly according to a direction of the current, so as to cause the first optical element to move with respect to the one or more axes. When the current flows through the coil, the respective magnet may be driven to move upwardly or downwardly based on Fleming's left-hand rule.

By means of the method for performing optical image stabilization, the optical image stabilization may be realized to compensate for the movement of the optical imaging system, such that the image quality can be improved without incurring the distortion, color shift or image blur issue.

In some embodiments, when the same current flows through the at least two coils, the at least two magnets are driven to move, to cause the first optical element to rotate around a first axis parallel to an imaging surface and perpendicular to the at least two magnets; when the different currents flow through the at least two coils, the at least two magnets are driven to move, to cause the first optical element to rotate around a second axis perpendicular to the imaging surface, wherein the imaging surface is a surface on which an image is formed.

In some embodiments, the optical imaging system includes a fixed first lens component, a movable second lens component and a movable third lens component. The method further includes driving the movable second lens component and the movable third lens component to move together along an axis perpendicular to an imaging surface based on a mode switching instruction. The imaging surface is a surface on which an image is formed.

In some embodiments, driving the movable second lens component and the movable third lens component to move together along the axis perpendicular to the imaging surface based on the mode switching instruction further includes driving the movable second lens component to move between a first position and a second position based on the mode switching instruction to switch the optical imaging system between a telephoto mode and a wide-angle mode.

In some embodiments, driving the movable second lens component and the movable third lens component to move together along the axis perpendicular to the imaging surface based on the mode switching instruction further includes driving the movable third lens component to move to a focusing position with movement of the movable second lens component, wherein the focusing position indicates a position at which the optical imaging system realizes focusing.

In some embodiments, each of the movable second lens component and the movable third lens component is moved within a range of 0-5 cm.

In some embodiments, a movement resolution each of the movable second lens component and the movable third lens component reaches 0.3 μm.

In some embodiments, the movable second lens component is driven by a smooth impact drive mechanism to move and the movable third lens component is driven by a further smooth impact drive mechanism to move with movement of the movable second lens component.

By means of the piezoelectric driving mechanism, the auto focusing of the optical imaging system may be realized.

With the method for performing optical image stabilization according to embodiments of the present disclosure, the image stabilizing mechanism is configured to change a path of light based on the position and attitude information of the optical imaging system to compensate for the movement of the optical imaging system. The image stabilizing mechanism includes a first optical element, a support frame, at least two magnets and at least two coils. When a current flows through the coil, the respective magnet is driven to move according to a direction of the current, so as to cause the support frame carrying the first optical element to move with respect to one or more axes to change the path of the light. In this way, the optical image stabilization can be performed without incurring the attitude difference issue, the resonance issue or the distortion issue.

Further, in the method for performing optical image stabilization according to embodiments of the present disclosure, the optical lens component configured to receive the light from the first optical element for imaging is driven by the piezoelectric driving mechanism, such that an integration of electromagnetic and piezoelectric technology is realized. Furthermore, the optical imaging system according to embodiments of the present disclosure is advantageous in saving cost and space.

The present disclosure also provides an electronic device.

Figure 7:
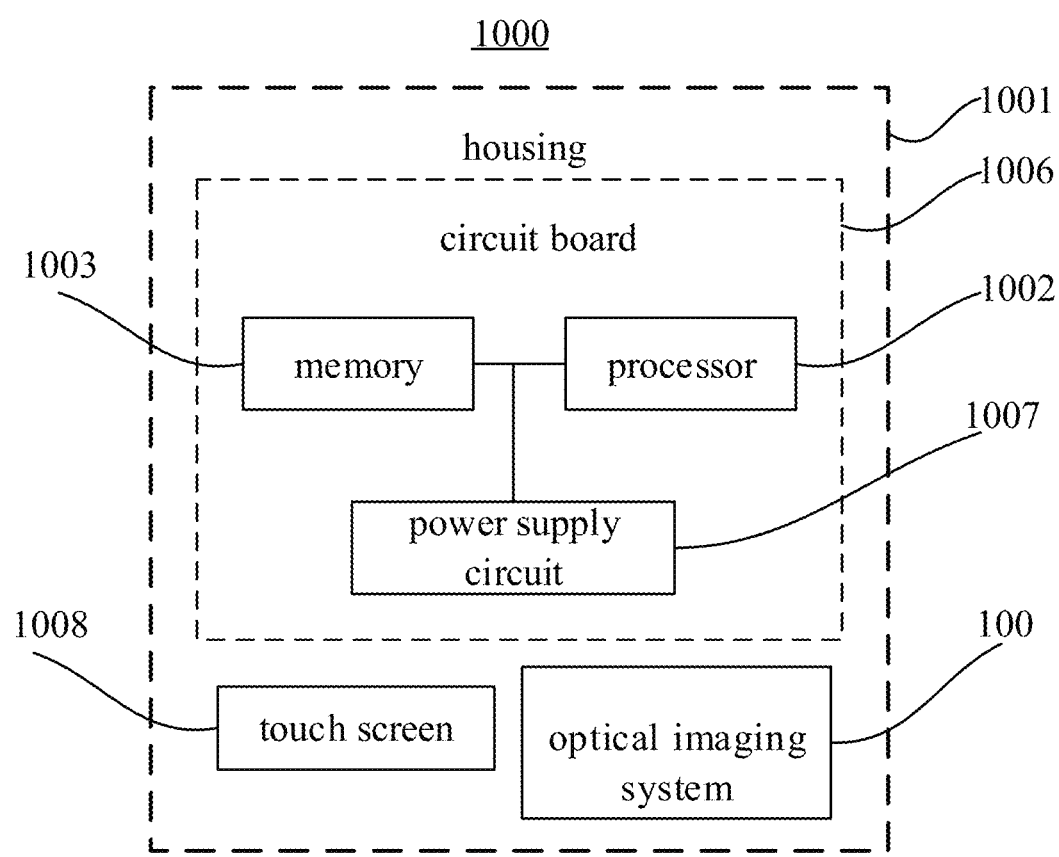
FIG. 7 is a block diagram of an electronic device according to an embodiment of the present disclosure.

FIG. 7 is a block diagram of an electronic device 1000 according to an embodiment of the present disclosure.

Referring to FIG. 7, the electronic device 1000 of the present disclosure includes a housing 1001, a processor 1002, a memory 1003, a circuit board 1006, a power supply circuit 1007, and an optical imaging system 100. The circuit board 1006 is enclosed by the housing 1001. The processor 1002 and the memory 1003 are positioned on the circuit board 1006. The power supply circuit 1007 is configured to provide power for respective circuits or components of the electronic device 1000. The memory 1003 is configured to store executable program codes. As illustrated above, the optical imaging system 100 includes a sensor, an optical lens component 13 configured to receive the light for imaging and an image stabilizing mechanism 14. The image stabilizing mechanism 14 includes: a first optical element 140 configured to change a path of the light, a support frame 145 configured to support the first optical element, at least two magnets 141, disposed on two sides of the first optical element, respectively; and at least two coils 142, facing to the at least two magnets, respectively.

The processor 1002 is configured to run a program corresponding to the executable program codes by reading the executable program codes stored in the memory 1003, to perform following operations: obtaining position and attitude information of the optical imaging system; providing currents to the at least coils based on the position and attitude information to drive the at least two magnets to move according to a direction of the current, so as to cause the support frame carrying the first optical element to move with respect to one or more axes to change the path of the light. In some embodiments, the electronic device 1000 may include a touch screen 1008.

In some implementations, the optical imaging system includes a fixed first lens component, a movable second lens component and a movable third lens component. The processor 1002 is configured to run a program corresponding to the executable program codes by reading the executable program codes stored in the memory 1003, to perform following operations: driving the movable second lens component and the movable third lens component to move together along an axis perpendicular to an imaging surface based on a mode switching instruction, wherein the imaging surface is a surface on which an image is formed.

In some implementations, the processor 1002 is configured to run a program corresponding to the executable program codes by reading the executable program codes stored in the memory 1003, to drive the movable second lens component and the movable third lens component to move together along the axis perpendicular to the imaging surface based on the mode switching instruction by acts of: driving the movable second lens component to move between a first position and a second position based on the mode switching instruction to switch the optical imaging system between a telephoto mode and a wide-angle mode.

In some implementations, the processor 1002 is configured to run a program corresponding to the executable program codes by reading the executable program codes stored in the memory 1003, to drive the movable second lens component and the movable third lens component to move together along the axis perpendicular to the imaging surface based on the mode switching instruction by acts of: driving the movable third lens component to move to a focusing position with movement of the movable second lens component, wherein the focusing position indicates a position at which the optical imaging system realizes focusing.

It may be understood that, electronic device 1000 generally includes both of the front camera and the rear camera. Images captured by the front camera and the rear camera may be processed with the image processing method according to embodiments of the present disclosure, thus improving the user experience.

In some implementations, the electronic device may be a mobile phone or a tablet computer, which is not limited herein.

The mobile phone and the tablet computer both include an imaging apparatus 100. When the mobile phone or the tablet computer is used to capture an image, the image may be processed with the image processing method according to embodiments of the present disclosure, so as to improve the distinguishability and the resolution of the image.

It may be understood that, other electronic device having a capacity of capturing images may be included.

The electronic device 1000 may further include an inputting component (not illustrated in FIG. 7). It should be understood that, the inputting component may further include one or more of the followings: an inputting interface, a physical button of the electronic device 1000, a microphone, etc.

It should be understood that, the electronic device 1000 may further include one or more of the following components (not illustrated in FIG. 7): an audio component, an input/output (I/O) interface, a sensor component and a communication component. The audio component is configured to output and/or input audio signals, for example, the audio component includes a microphone. The I/O interface is configured to provide an interface between the processor 1002 and peripheral interface modules. The sensor component includes one or more sensors to provide status assessments of various aspects of the electronic device 1000. The communication component is configured to facilitate communication, wired or wirelessly, between the electronic device 1000 and other devices.

It is to be understood that phraseology and terminology used herein with reference to device or element orientation (such as, terms like "center", "longitudinal", "lateral", "length", "width", "height", "up", "down", "front", "rear", "left", "right", "vertical", "horizontal", "top", "bottom", "inside", "outside", "clockwise", "anti clockwise", "axial", "radial", "circumferential") are only used to simplify description of the present invention, and do not indicate or imply that the device or element referred to must have or operated in a particular orientation. They cannot be seen as limits to the present disclosure.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

In the present disclosure, unless specified or limited otherwise, a structure in which a first feature is "on" a second feature may include an embodiment in which the first feature directly contacts the second feature, and may also include an embodiment in which the first feature indirectly contacts the second feature via an intermediate medium. Moreover, a structure in which a first feature is "on", "over" or "above" a second feature may indicate that the first feature is right above the second feature or obliquely above the second feature, or just indicate that a horizontal level of the first feature is higher than the second feature. A structure in which a first feature is "below", or "under" a second feature may indicate that the first feature is right under the second feature or obliquely under the second feature, or just indicate that a horizontal level of the first feature is lower than the second feature.

Various embodiments and examples are provided in the following description to implement different structures of the present disclosure. In order to simplify the present disclosure, certain elements and settings will be described. However, these elements and settings are only examples and are not intended to limit the present disclosure. In addition, reference numerals may be repeated in different examples in the disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. An optical imaging system, comprising:
    a sensor, configured to obtain position and attitude information of the optical imaging system;
    an optical lens component, configured to receive light for imaging;
    an image stabilizing mechanism, configured to compensate for a movement of the optical imaging system based on the position and attitude information;
    wherein the image stabilizing mechanism comprises:
    a first optical element, configured to change a path of the light to be directed into the optical lens component;
    a support frame, configured to support the first optical element;
    at least two magnets, disposed on two sides of the first optical element, respectively; and
    at least two coils, facing to the at least two magnets, respectively, wherein when a current is introduced into a coil based on the position and attitude information, a respective magnet is driven to move according to a direction of the current, to cause the support frame carrying the first optical element to move with respect to a plurality of axes to change the path of the light, wherein in response to different currents flowing through the at least two coils, the at least two magnets are driven to move, to cause the first optical element to rotate around an axis perpendicular to an imaging surface, wherein the imaging surface is a surface on which an image is formed.

2. The system of claim 1, wherein when the same current flows through the at least two coils, the at least two magnets are driven to move, to cause the first optical element to rotate around a first axis parallel to the imaging surface and perpendicular to the at least two magnets.

3. The system of claim 1, further comprising:
    a bearing component, comprising at least two ball bearings and configured to hold the support frame.

4. The system of claim 3, wherein the image stabilizing mechanism further comprises:
    at least two yokes, facing to the at least two coils, respectively, and configured to generate magnetic force with the at least two magnets to hold the support frame.

5. The system of claim 1,
    wherein the optical lens component comprises a fixed first lens component, a movable second lens component and a movable third lens component;
    wherein the optical imaging system further comprises a piezoelectric driving mechanism configured to drive the movable second lens component and the movable third lens component to move together along an axis perpendicular to the imaging surface based on a mode switching instruction, wherein the imaging surface is a surface on which an image is formed.

6. The system of claim 5, wherein the piezoelectric driving mechanism is configured to drive the movable second lens component to move between a first position and a second position based on the mode switching instruction to switch the optical imaging system between a telephoto mode and a wide-angle mode.

7. The system of claim 5, wherein the piezoelectric driving mechanism is configured to drive the movable third lens component to move to a focusing position with movement of the movable second lens component, wherein the focusing position indicates a position at which the optical imaging system realizes focusing.

8. The system of claim 5, wherein the piezoelectric driving mechanism comprises two drive mechanisms, one drive mechanism is configured to drive the movable second lens component to move and the other drive mechanism is configured to drive the movable third lens component to move with movement of the movable second lens component.

9. The system of claim 5, wherein the piezoelectric driving mechanism comprises:
    a position detection sensor, configured to detect positions of the movable second lens component and the movable third lens component.

10. The system of claim 5, wherein each of the movable second lens component and the movable third lens component is moved within a range of 0-5 cm.

11. A method for performing optical image stabilization, comprising:
    obtaining position and attitude information of an optical imaging system, wherein the optical imaging system comprises: a sensor; an optical lens component, configured to receive light for imaging; an image stabilizing mechanism comprising a first optical element, configured to change a path of the light; a support frame, configured to support the first optical element; at least two magnets, disposed on two sides of the first optical element, respectively, and at least two coils, facing to the at least two magnets, respectively;

introducing currents into the at least two coils based on the position and attitude information to drive the at least two magnets to move according to a direction of the current, to cause the support frame carrying the first optical element to move with respect to a plurality of axes to change the path of the light, wherein in response to different currents flowing through the at least two coils, the at least two magnets are driven to move, to cause the first optical element to rotate around an axis perpendicular to an imaging surface, wherein the imaging surface is a surface on which an image is formed.

12. The method of claim 11, wherein when the same current flows through the at least two coils, the at least two magnets are driven to move, to cause the first optical element to rotate around a first axis parallel to the imaging surface and perpendicular to the at least two magnets.

13. The method of claim 11, wherein the optical imaging system comprises a fixed first lens component, a movable second lens component and a movable third lens component; wherein the method further comprises:

driving the movable second lens component and the movable third lens component to move together along an axis perpendicular to the imaging surface based on a mode switching instruction, wherein the imaging surface is a surface on which an image is formed.

14. The method of claim 13, wherein driving the movable second lens component and the movable third lens component to move together along the axis perpendicular to the imaging surface based on the mode switching instruction comprises:

driving the movable second lens component to move between a first position and a second position based on the mode switching instruction to switch the optical imaging system between a telephoto mode and a wide-angle mode.

15. The method of claim 13, wherein driving the movable second lens component and the movable third lens component to move together along the axis perpendicular to the imaging surface based on the mode switching instruction further comprises:

driving the movable third lens component to move to a focusing position with movement of the movable second lens component, wherein the focusing position indicates a position at which the optical imaging system realizes focusing.

16. The method of claim 13, wherein each of the movable second lens component and the movable third lens component is moved within a range of 0-5 cm.

17. The method of claim 13, wherein the movable second lens component is driven by a drive mechanism to move and the movable third lens component is driven by a further drive mechanism to move with movement of the movable second lens component.

18. A non-transitory computer-readable medium having instructions stored thereon for execution by a processor to implement operations of a method for performing optical image stabilization, comprising:

obtaining position and attitude information of an optical imaging system, wherein the optical imaging system comprises: a sensor; an optical lens component, configured to receive light for imaging; an image stabilizing mechanism comprising a first optical element, configured to change a path of the light; a support frame, configured to support the first optical element; at least two magnets, disposed on two sides of the first optical element, respectively, and at least two coils, facing to the at least two magnets, respectively; and introducing currents into the at least two coils based on the position and attitude information to drive the at least two magnets to move according to a direction of the current, to cause the support frame carrying the first optical element to move with respect to a plurality of axes to change the path of the light, wherein in response to different currents flowing through the at least two coils, the at least two magnets are driven to move, to cause the first optical element to rotate around an axis perpendicular to an imaging surface, wherein the imaging surface is a surface on which an image is formed.

* * * * *